United States Patent [19]

Howell

[11] 4,391,646

[45] Jul. 5, 1983

[54] GLASS BUBBLES OF INCREASED COLLAPSE STRENGTH

[75] Inventor: Peter A. Howell, St. Paul, Minn.

[73] Assignee: Minnesota Mining and Manufacturing Company, St. Paul, Minn.

[21] Appl. No.: 352,164

[22] Filed: Feb. 25, 1982

[51] Int. Cl.$^3$ .................. C04B 31/02; C03C 13/00
[52] U.S. Cl. ........................ 106/97; 501/33; 501/65
[58] Field of Search ..................... 501/33, 65

[56] References Cited

U.S. PATENT DOCUMENTS

| | | | |
|---|---|---|---|
| 3,129,086 | 4/1964 | Veatch et al. | 65/142 |
| 3,230,064 | 1/1966 | Veatch et al. | 65/142 |
| 3,365,315 | 1/1968 | Beck et al. | 106/40 |

OTHER PUBLICATIONS

M. A. Krenzke and R. M. Charles ("Elastic Buckling Strength of Spherical Glass Shells, " David Taylor Model Basin Report No. 1759, Sep. 1963).

*Primary Examiner*—James Poer
*Attorney, Agent, or Firm*—C. Alexander; D. M. Sell; R. R. Tamte

[57] ABSTRACT

Glass bubbles of increased collapse strength are prepared. The bubbles have an average particle density of 0.4 or more and are made of glass that consists essentially of SiO$_2$ (60–90 weight-percent), alkali metal oxide (2–20 weight-percent), B$_2$O$_3$ (1–30 weight-percent), sulfur (0.005 to 0.5 weight-percent), and other conventional glass-forming ingredients.

34 Claims, 1 Drawing Figure

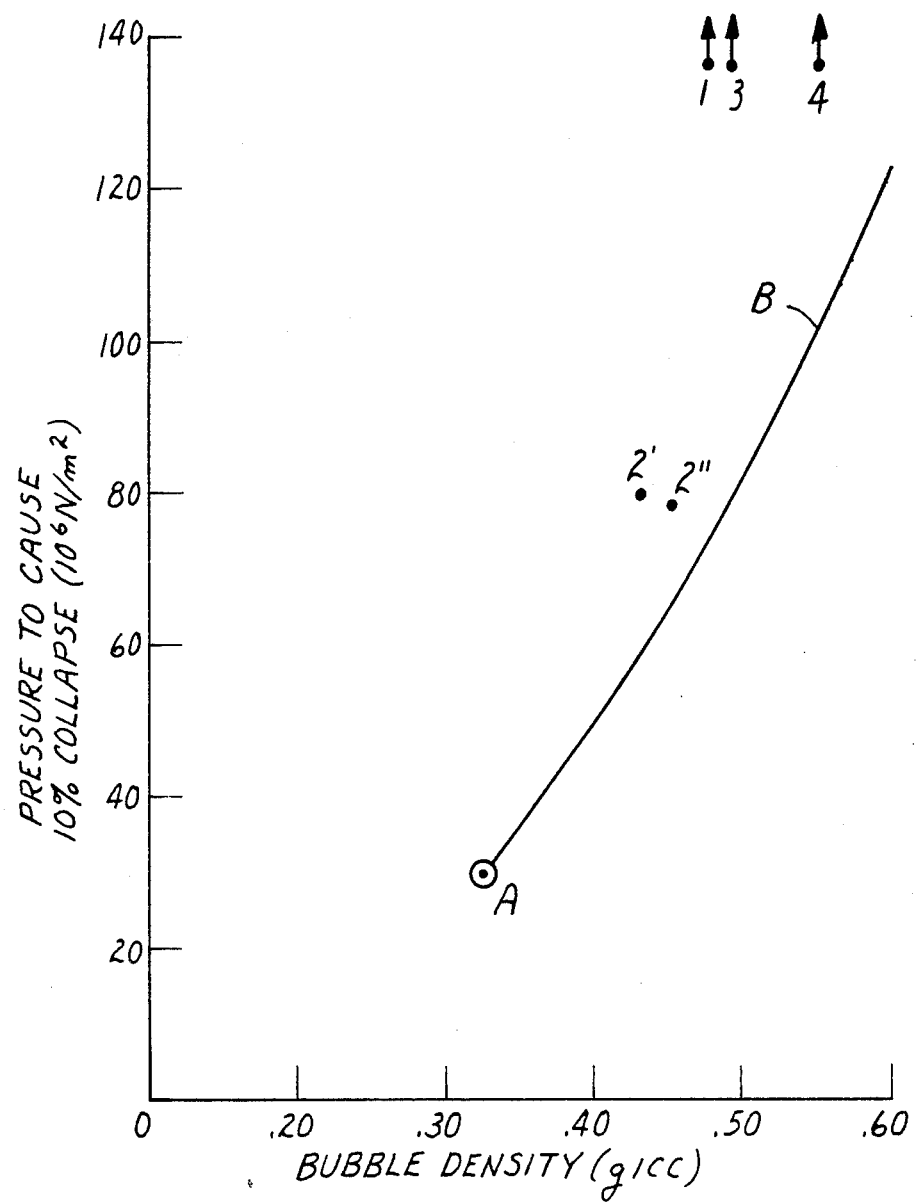

GLASS BUBBLES OF INCREASED COLLAPSE STRENGTH

FIELD OF THE INVENTION

This invention relates to glass bubbles, i.e., hollow glass microspheres, made by expanding glass particles with a blowing agent contained in the particles.

BACKGROUND OF THE INVENTION

Existing glass bubbles have wide utility for many purposes, but they have only limited utility when very high crushing strengths are needed. For example, existing glass bubbles have only limited utility as a filler for polymeric parts made by injection molding operations, which subject the bubbles to high pressure.

Theoretically, the collapse strength of an individual glass bubble should be as given by a formula devised by M. A. Krenzke and R. M. Charles ("Elastic Buckling Strength of Spherical Glass Shells," David Taylor Model Basin Report No. 1759, September, 1963), $$\text{Theoretical collapse strength} = \frac{0.8E \, (h/r)^2}{\sqrt{1 - V^2}}$$

where "E" is Young's modulus for the glass of the bubbles, "h" is the thickness of the wall of the bubbles, "r" is the radius of the bubble, and "V" is Poisson's ratio for the glass.

In actual practice, when a batch of glass bubbles is tested, a vast majority of bubbles in the batch collapse at a pressure substantially less than the theoretical strength, e.g., because of inherent flaws in the structure of the bubbles. One practical measure of strength for a batch of glass bubbles is to determine the pressure required (in the test described in ASTM D-3102-72, with glycerol used in place of water) to obtain a ten-volume-percent collapse of bubbles. By this test, commercial glass bubbles of the highest known strength (made under the teachings of U.S. Pat. No. 3,365,315) exhibit a ten-volume-percent collapse at a pressure of about 4300 psi (29.6 N/m$^2$), which is less than 30 percent of the theoretical strength for those bubbles.

SUMMARY OF THE INVENTION

The present invention provides a new class of glass bubbles which are capable of a substantially higher percentage of theoretical strength than achieved by previous commercially available glass bubbles. These new glass bubbles are generally of the type taught in the previously mentioned U.S. Pat. No. 3,365,315, but it has been found that selected compositions and selected bubble densities (i.e., selected bubble wall thicknesses) achieve superior strengths.

Briefly, glass bubbles of the present invention have an average particle density of at least 0.4 gram/cubic centimeter, and are made of glass that consists essentially of the following ingredients in the stated amounts (amounts are in weight-percent, and "R" represents metal or an element like phosphorous which combines with oxygen in a glass matrix in an "oxide" compound; the ingredients and amounts listed refer to the completed bubble, and the ingredients may be present either in the glass shell or wall of the bubble or in the space enclosed within the bubble):

| | |
|---|---|
| SiO$_2$ | 60–90 |
| Alkali metal oxide | 2–20 |
| B$_2$O$_3$ | 1–30 |
| S (either by itself or in its various combined forms with oxygen) | 0.005–0.5 |
| RO | 0–25 |
| RO$_2$ (other than SiO$_2$) | 0–10 |
| R$_2$O$_3$ (other than B$_2$O$_3$) | 0–20 |
| R$_2$O$_5$ | 0–10 |
| F (as fluoride) | 0–5 |
| Other ingredients | 0–2 |

The bubbles generally have an average diameter between about 5 and 200 micrometers.

Glass bubbles as described have been found to exhibit collapse strengths (the pressure required to obtain a 10-percent collapse of a sample of the bubbles) of greater than 30 percent, and in preferred glass bubbles greater than 40 percent, of the theoretical collapse strength defined above. For purposes herein, the percentage of theoretical collapse strength achieved by a sample of glass bubbles is defined as the Relative Strength of the sample.

As indicated above, the improved strength is believed traceable in part to use of increased wall thickness, or greater density, of the bubbles. The formula for theoretical strength stated above indicates that strength increases as wall thickness increases, but we have found that strength can increase faster with increase in wall thickness than one would expect by extrapolation using the formula. This discovery is illustrated in the attached drawing, which presents results achieved for a particular commercial bubble and sample bubbles of the invention, and shows those results in relation to a plot based on the stated formula. Specifically, point A in the drawing represents the collapse strength (the pressure required to cause 10 percent collapse of a sample of bubbles) in newtons/square meter and the density in grams/cubic centimeter for a commercial glass bubble having the highest Relative Strength exhibited by any known commercial glass bubble. Curve B is a plot of the collapse strengths that would be expected, based on the stated formula, if the density or wall thickness of the commercial bubble were increased. Points 1–4 are the collapse strengths and densities measured for sample high-density bubbles of the present invention (Examples 1–4 herein), and show that the collapse strengths actually achieved for these high-density bubbles are greater than predicted by the formula-based Curve B (the Young's modulus and Poisson's ratio for the commercial glass bubbles and sample bubbles of the invention are similar enough so that the only significant variation in the parameters of the formula are the change in wall thickness and radius).

The wall thickness is controlled and collapse strength increased by controlling the amount of sulfur (or combinations of oxygen and sulfur) in the composition from which the bubble is made, and thereby controlling the amount of blowing agent in the bubbles. Glass bubbles of the invention are prepared by the general procedure taught in the previously mentioned U.S. Pat. No. 3,365,315, which is incorporated herein by reference. According to the procedure taught in that patent, amorphous glass particles are first prepared and then heated to convert them to the bubble state. Amorphous glass particles may be prepared, for example, by heating a mixture of glass-forming ingredients to their melting or fusion temperature, and then cooling and crushing the fused glass to particulate form. The particles are heated to a temperature high enough to cause the glass of the particles to become plastic and high enough to cause a gaseous material to form within the particle and expand the particle. During heating and bubble formation the particles are maintained in a suspended state either by directing gas currents under the particles or by allowing the particles to fall freely through a heating zone.

Sulfur, or compounds of oxygen and sulfur, serve as the principal blowing agent in glass bubbles of the present invention, and it has been found that by use of sulfur within the range stated above glass bubbles of high density can be achieved. Also, the high-density bubbles can be produced in high yields, i.e., a high percentage of the amorphous glass particles can be converted to bubble form. The capability for high yields is an important aspect of the invention, because it makes the provision of high-density bubbles economically feasible. When glass bubbles of the invention are prepared, at least 50 volume-percent of the amorphous glass particles are generally converted to bubble form, and preferably at least 85 volume-percent are converted.

The glass bubbles can be separated from the non-expanded particles by flotation, usually on water but also on other liquids to separate particles of different density. However, for reasons of economy glass bubbles of the invention are usually supplied without separation from the non-expanded particles. The invention can be thought of as supplying a free-flowing mass of glass particles, at least 50 volume-percent and preferably at least 85 volume-percent of which float on water and satisfy the description of glass bubbles stated above.

Another factor that is believed to contribute to the strength and other desired properties of glass bubbles of the invention is a change during the process of bubble formation in the composition of the glass particles, e.g., through loss of volatile ingredients. This change in composition is accompanied by an increase in the viscosity or softening point of the glass. For example, glass particles used to form bubbles of the invention generally have a softening point (measured by ASTM C-338-73) of about 650°–725° C., whereas the completed glass bubbles generally have a softening point greater than about 750° C. The increase in viscosity is considered beneficial, e.g., by assisting in retention of spherical form and desired diameter during solidification of the bubbles and by acceleration of solidification.

BRIEF DESCRIPTION OF THE DRAWING

The drawing is a graph plotting the pressure required to produce a 10% collapse versus the density of the glass bubbles.

DETAILED DESCRIPTION

As indicated above, $SiO_2$ is a major ingredient in glass bubbles of the invention, accounting generally for between about 60 and 90 weight-percent of the bubbles and preferably between about 65 and 85 weight-percent. (Many of the constituents of glass bubbles of the invention are listed as oxides, as is customary in the glass art. The exact form that the constituents take in the glass is not definitely known, but the practice of listing the constituents as oxides has been considered by glass technologists to be the most convenient and practical from the standpoint of rapid comprehension.) As the amount of $SiO_2$ is reduced below 60 or 65 weight-percent, the yield of bubbles is drastically reduced; whereas increases beyond 85 or 90 weight-percent make the glass composition too viscous and of too high a softening point for optimum formation of glass bubbles.

Alkali metal oxide (preferably $Na_2O$, but alternatively $K_2O$ or $Li_2O$, or even uncommon compounds such as $Cs_2O$ or $Rb_2O$) is included together with the $SiO_2$ to assist in obtaining a desired molten and low-viscosity condition for formation of glass bubbles. The alkali metal oxide is included in an amount of at least about 2 weight-percent, and preferably at least 5 weight-percent of the final glass bubble. Generally, alkali metal oxide will not exceed 20 weight-percent, preferably 15 weight-percent, to avoid making the melt too fluid and to improve chemical durability of the finished bubbles.

$B_2O_3$ should be included in the glass bubbles in an amount of at least about 1, and preferably at least 2, weight-percent to assure that a high percentage of glass particles are converted to bubble form. The amount of $B_2O_3$ generally does not exceed 30 weight-percent, and preferably is less than 10 weight-percent to improve the chemical resistance of the glass bubbles.

The glass bubbles can be given increased water-insolubility by including RO oxides (i.e., oxides of bivalent metal) in an amount of 1 or more and preferably 3 or more weight-percent. CaO and/or MgO are preferred, but other RO oxides can be used in addition or instead, including BaO, SrO, ZnO, and PbO.

As noted above, sulfur, presumably combined with oxygen (e.g., $SO_2$ or $SO_3$), serves as a blowing agent to expand glass particles into bubbles of the invention. An amount of sulfur (as sulfate, sulfite, etc.) is selected for inclusion in the glass particles from which the bubbles are formed to achieve a desired expansion and thus a desired density or wall thickness in the finished bubbles. By controlling the amount of sulfur in the particles and the amount and length of heating to which the particles are exposed (e.g., the rate at which particles are fed through a flame), the amount of expansion of the particles can be controlled to provide a selected wall thickness. Some sulfur, or oxygen compounds with sulfur, are contained in the finished bubbles, primarily in the gaseous contents within the bubbles. Bubbles of the invention generally include sulfur within a range of about 0.005 to 0.5 weight-percent, and preferably within a range of 0.01 to 0.2 weight-percent. Highest strengths have so far been achieved with amounts of sulfur less than 0.1 weight-percent. Other blowing agents, such as $CO_2$, $O_2$ or $N_2$, may be included in addition to the sulfur oxides; in fact, oxygen is quite commonly present as a residue from a sulfate ion. (Glass bubbles of the invention can be filled with gaseous materials after formation, but such fills are not considered in describing the amounts of ingredients in bubbles of the invention.)

Many other ingredients are useful in glass compositions and can be included in glass bubbles of the invention to contribute particular properties or characteristics. The table presented earlier lists general ranges for metal oxides. $RO_2$, which is often present as an impurity in amounts up to 1 weight-percent, but is seldom used otherwise except for unusual purposes, includes such ingredients as $TiO_2$, $MnO_2$, and $ZrO_2$. $R_2O_3$ includes $Al_2O_3$, $Fe_2O_3$, and $Sb_2O_3$, with $Fe_2O_3$ being the most likely used; preferably these ingredients account for less than 5 weight-percent of the bubbles. $R_2O_5$ includes such ingredients as $P_2O_5$ and $V_2O_5$, and is also preferably present in amounts less than 5 weight-percent.

Fluorine may also be included as fluorides and appears to act as a fluxing agent, helping in melting of the glass composition.

As indicated above, the finished bubbles have a density of at least 0.4 gram per cubic centimeter, which is equivalent to a ratio of wall thickness to bubble diameter of about 0.029. Density is determined (according to ASTM D-2840-69) by weighing a sample of bubbles and determining the volume of the sample with an air comparison pycnometer (Beckman Model 930). Higher densities can produce higher strengths, and densities of 0.5 or 0.6 or more are preferred for some uses. There are few known uses for bubbles having a density greater than about one gram per cubic centimeter.

Glass bubbles of the invention generally have an average diameter between about 5 and 200 micrometers, and preferably between about 15 and 100 micrometers. Size can be controlled by controlling the size of the initial amorphous glass feed particles, the amount of sulfur-oxygen compounds in the particles, the length of time that the particles are heated, etc. The bubbles may be prepared on apparatus well known in the bubble-forming art, e.g., apparatus similar to that described in U.S. Pat. Nos. 3,230,064 or 3,129,086.

Bubbles of the invention may be used for a variety of purposes. They are of special advantage as a lightweight filler in molded polymeric products such as injection-molded or extrusion-molded parts, or in any other product or use where in the course of preparing or using the product or bubbles a high pressure is applied to the bubbles. Oil-well cements, i.e., inorganic cementitious materials which harden when mixed with water, can advantageously include dispersed bubbles of the invention. Also, bubbles of the invention can be filled with gaseous contents under pressure.

The invention will be further illustrated in the following examples (amounts are in weight-percent unless otherwise specified, except that size distributions are in volume-percent).

EXAMPLE 1

A glass-forming batch weighing 1016 g. was prepared by mixing particles of $SiO_2$, (600 g.), $H_3BO_3$, (110.3 g.), $CaCO_3$, (48 g.), $Na_2CO_3$, (190.2 g.), $NH_4H_2PO_4$, (10.9 g.), $CaF_2$, (36.2 g.), ZnO (15.6 g.), and $Na_2SO_4$, (4.5 g.), and melting the mixture in a clay crucible for 3 hours at 2330° F. (1277° C.). The molten glass was quenched in water to give a frit having a composition calculated as: 68.84% $SiO_2$, 7.12% $B_2O_3$, 0.773% $P_2O_5$, 6.07% CaO, 12.99% $Na_2O$, 1.79% ZnO, 2.03% F and 0.116% S. The resulting frit was milled in an amount of 500 g. with 2000 g. of grinding media in a one-gallon (3.78-liter) ball mill for one-half hour. The mill output was classified to produce feed particles having a size distribution 90% smaller than 59.0 micrometers, 50% smaller than 30.10 micrometers, and 10% smaller than 9.07 micrometers (Leeds & Northrup Microtrac Particle Size Analyzer, Model 17991-02).

The described feed particles were passed through a gas/air flame (approximately stoichiometric) at a rate of 0.45 pounds/hour (about 0.2 kilogram/hour), which is equivalent to 12.2 pounds for each million BTU's of heat provided by the flame. A bubble-containing product was prepared which had a total product density of 0.513 g/cc and contained 92.5 weight-percent (98.4 volume-percent) bubbles collected by floating on water. The collected bubbles were of size 90% less than 82.5 micrometers, 50% less than 49.3 micrometers and 10% less than 22.7 micrometers, and they had an average particle density of 0.483 g/cc. Analysis of the total product and bubbles indicated that they contained 0.066% sulfur; that is, 56–57% of the theoretical sulfur in the original glass frit was retained in the bubbles.

Less than 10 volume-percent of the collected bubbles collapsed when subjected to a hydrostatic pressure of 20,000 psi ($139.89 \times 10^6$ N/m$^2$). Glass bubbles of 0.483 g/cc have a theoretical collapse strength of 36,850 psi ($254.072 \times 10^6$ N/m$^2$). Therefore, 90% volume-percent of the bubbles of this example are stronger than 54% of theory, meaning that their Relative Strength is greater than 54 percent.

Point 1 in FIG. 1 represents the density and collapse strength for the bubbles of this example. An arrow is attached to point 1 to indicate that the pressure required to cause 10-percent collapse is higher than 20,000 psi ($137.89 \times 10^6$ N/m$^2$). The machine used to test the bubbles was unable to apply a higher pressure than 20,000 psi ($137.89 \times 10^6$ N/m$^2$), and therefore the collapse strength for the bubbles, and correspondingly their Relative Strength, are higher than represented by point 1.

EXAMPLE 2

Glass frit was prepared having a composition like that of Example 1, except that the amount of sulfur was calculated to be 0.167 weight-percent. Particles prepared by milling and screening according to the process of Example 1 were passed through a flame like that of Example 1 at a rate of 3.0 pounds (1.36 kilograms)/hour (equivalent to 82 pounds/$10^6$ BTU). The resulting bubble-containing product had a total product density of 0.528 g/cc and contained 95.0 volume-percent bubbles of density 0.434. 90 volume-percent of these bubbles survived a hydrostatic pressure of 11,400 psi ($78.6 \times 10^6$ N/m$^2$) (theoretical collapse strength 29,200 psi, $201 \times 10^6$ N/m$^2$), giving a Relative Strength of 39 percent (see point 2' in the drawing).

In a second run, the same particles were passed through the flame at 4.26 pounds/hour (115 pounds/$10^6$ BTU), giving a bubble-containing product of density 0.585 g/cc, which contained 92.8 volume-percent bubbles of density 0.451 g/cc. 90 volume-percent of these bubbles survived a hydrostatic pressure of 11,160 psi ($76.9 \times 10^6$ N/m$^2$) (theoretical collapse strength 31,800 psi; $219 \times 10^6$ N/m$^2$) giving a Relative Strength of 35.1 percent (see point 2" in the drawing).

EXAMPLE 3

A 1016 g.-batch of ingredients as described in Example 1 was melted for 3 hours at 2330° F. (1277° C.) and quenched in water. The resulting frit was analyzed as comprising, in weight-percent, 69.11% $SiO_2$, 9.30% $B_2O_3$, 0.69% $P_2O_5$, 5.87% CaO, 0.15% MgO, 1.78% ZnO, 11.51% $Na_2O$, 0.11% $K_2O$, 0.008% $Li_2O$ and 0.29% $SO_3$. The softening point of the frit was 691±3° C. The frit in an amount of 500 g. was milled and classified to yield a feed particulate material of size distribution: 90% smaller than 59.5 micrometers, 50% smaller than 28.8 micrometers, 10% smaller than 7.92 micrometers.

The feed particles were passed through a gas/air flame (approximately stoichiometric) at a rate of 1.0 pounds (0.45 kilogram)/hour (27 pounds/$10^6$ BTU). The resulting bubble-containing product had a total product density of 0.533 g/cc and contained 98.3 volume-percent bubbles of density 0.499 g/cc. The collected bubbles were of size distribution 90% less than 82.2 micrometers, 50 percent less than 47.6 micrometers, and 10% less than 19.7 micrometers. The glass in these bubbles by analysis contained 77.77% $SiO_2$, 4.64% $B_2O_3$, 0.88% $P_2O_5$, 6.75% CaO, 0.17% MgO, 1.30% ZnO, 7.70% $Na_2O$, 0.23% $K_2O$, 0.006% $Li_2O$ and 0.02% $SO_3$. Sulfur analysis of the bubble product and bubbles gave 0.083 and 0.079% S, respectively, e.g., 68–72% of the sulfur in the feed was retained in the final product (the above analyses suggest that about 90% of sulfur remains as gas, $SO_2$, inside the bubble). The softening point of the bubbles was greater than 777° C.

Less than 10 volume-percent of these bubbles collapsed when subjected to a hydrostatic pressure of 20,000 psi ($137.9 \times 10^6$ N/m$^2$). Glass bubbles of 0.499 g/cc density have a theoretical collapse strength of 39,600 psi ($273 \times 10^6$ N/m$^2$). Therefore, 90% of the bubbles of this example are stronger than 50.5% of theory; e.g., Relative Strength is greater than 50.5 percent.

COMPARATIVE EXAMPLE

The commercial glass bubbles represented by point A in the drawing are made from a glass frit having the following calculated composition:

| | |
|---|---|
| $SiO_2$ | 68.67 |
| $B_2O_3$ | 7.11 |
| $P_2O_5$ | 0.77 |
| CaO | 6.05 |
| $Na_2O$ | 12.96 |
| ZnO | 1.78 |
| F | 2.12 |
| $SO_3$ | 0.53 (equivalent to 0.21% S) |

The milled frit formed from this glass has a sulfur content of 0.147 weight-percent. The final bubble-containing product has a density of 0.393 gram per cubic centimeter and contains 96.7 volume-percent of glass bubbles having a density of 0.325 gram per cubic centimeter, and a sulfur content of 0.111 percent. A ten-percent collapse of the bubbles occurs at a hydrostatic pressure of 4300 psi (29.6 N/m$^2$). The bubbles have a theoretical collapse strength of 15,850 psi ($109 \times 10^6$ N/m$^2$) meaning that the bubbles have a Relative Strength of 29.6 percent.

EXAMPLE 4

The frit of Example 1 was milled and classified to yield feed particles having a size distribution: 90% smaller than 55.7 micrometers, 50% smaller than 23.2 micrometeres and 10% smaller than 4.97 micrometers. The feed particles were analyzed and found to contain 0.088 weight-percent S. This feed were passed through a gas/air flame (approximately stoichiometric) at a rate of 1.35 pound (0.61 kilogram)/hour (36.6 pounds/10$^6$ BTU). The resulting bubble-containing product had a total product density of 0.605 gm/cc and contained 91.8 volume percent of bubbles with an average particle density of 0.539 g/cc. These bubbles contained 0.071% S and were of size: 90% less than 72.6 micrometers, 50% less than 43.0 micrometers and 10% less than 18.5 micrometers. More than 90 volume percent of these bubbles survived a hydrostatic pressure of 20,000 psi ($137.89 \times 10^6$ N/m$^2$). Glass bubbles of 0.539 g/cc have a theoretical collapse strength of 46,350 psi; therefore the Relative Strength of these bubbles was greater than 43.1%.

EXAMPLE 5

This example shows the use of bubbles of the invention in injection-molded parts.

A bubble-containing product made from the glass of Example 2 was surface-treated with 1.9% of a silane coupling agent (($CH_3$)$_3$Si($CH_2$)$_3$—NH—($CH_2$)$_2$—NH—$CH_2$—$C_6H_4$—CH=$CH_2$.HCl); "Dow Z 6032" (supplied by Dow Chemical Company) by mixing the bubble-containing product and coupling agent in a tumbler overnight at room temperature and then drying the mixture for about 4 hours at 250° F. (121° C.). The treated product was screened through a 400-mesh U.S. Standard screen giving a free-flowing powder of density 0.638 g/cc. More than 90% of the powder survived a hydrostatic pressure of 20,000 psi ($137.89 \times 10^6$ N/m$^2$)

25 grams of the treated product was mixed with 510 g. of a thermoplastic acetal resin ("Delrin 8020" supplied by duPont), and the mixture was used to make a molded cylindrical part (0.5 centimeter diameter and 2.5 centimeters long) in an injection molding machine applying a mold pressure of approximately 1500 psi ($103.42 \times 10^6$ N/m$^2$). The bubbles occupied 9.9 volume-percent of the molded product which had a density of 1.350 g/cc. Since the density expected for such a part would be 1.355 g/cc, 96.3% of the bubbles present survived the injection molding process. The molded part was 5.3% lighter than its weight would have been if no bubbles had been present.

What is claimed is:

1. Glass bubbles of average diameter between about 5 and 200 micrometers and average particle density of at least 0.4 gram/cubic centimeter consisting essentially of the following ingredients in the stated weight-percents:

| | |
|---|---|
| $SiO_2$ | 60–90 |
| Alkali metal oxide | 2–20 |
| $B_2O_3$ | 1–30 |
| S | 0.005–0.5 |
| RO | 0–25 |
| $RO_2$ (other than $SiO_2$) | 0–10 |
| $R_2O_3$ (other than $B_2O_3$) | 0–20 |
| $R_2O_5$ | 0–10 |
| F | 0–5 |
| Other ingredients | 0–2 |

2. Glass bubbles of claim 1 having a density of at least 0.5 gram/cubic centimeter.

3. Glass bubbles of claim 1 having a softening point greater than about 750° C.

4. Glass bubbles of claims 1, 2 or 3 which include sulfur in an amount less than about 0.2 weight-percent.

5. Glass bubbles of claim 1, 2 or 3 which include sulfur in an amount less than about 0.1 weight-percent.

6. Glass bubbles of claim 1 which include at least 1 weight-percent of RO oxides.

7. Glass bubbles of claim 1 which include between about 2 and 10 weight-percent $B_2O_3$.

8. Glass bubbles of claim 1 which include at least 5 weight-percent of $Na_2O$.

9. Glass bubbles of claim 1 having a Relative Strength of at least 30 percent.

10. Glass bubbles of claim 1 in which the stated ingredients are present within the following weight-percent ranges:

| | |
|---|---|
| $SiO_2$ | 65-85 |
| $Na_2O + K_2O + Li_2O$ | 5-15 |
| $B_2O_3$ | 2-10 |
| S | 0.01-0.1 |
| RO | 1-15 |
| $RO_2$ (other than $SiO_2$) | 0-1 |
| $R_2O_3$ (other than $B_2O_3$) | 0-5 |
| $R_2O_5$ | 0-5 |
| F | 0-5 |
| Other ingredients | 0-2 |

11. Injection-molded article comprising a polymeric matrix and bubbles of claim 1 dispersed in the matrix.

12. Extrusion-molded article comprising a polymeric matrix and bubbles of claim 1 dispersed in the matrix.

13. Cement product comprising a cementitious matrix and glass bubbles of claim 1 dispersed in the matrix.

14. Glass bubbles of claim 1 containing a gaseous fill under pressure.

15. Free-flowing mass of glass particles, at least 85 volume-percent of which are glass bubbles that float on water, said glass bubbles having an average diameter between about 5 to 200 micrometers and an average particle density of at least 0.4 gram/cubic centimeter, and consisting essentially of the following ingredients in the stated weight-percents:

| | |
|---|---|
| $SiO_2$ | 60-90 |
| $Na_2O + K_2O + Li_2O$ | 2-20 |
| $B_2O_3$ | 1-30 |
| S | 0.005-0.5 |
| RO | 0-25 |
| $RO_2$ (other than $SiO_2$) | 0-10 |
| $R_2O_3$ (other than $B_2O_3$) | 0-20 |
| $R_2O_5$ | 0-10 |
| F | 0-5 |
| Other ingredients | 0-2 |

16. Glass particles of claim 15 in which the glass bubbles have a density of at least 0.5.

17. Glass particles of claim 15 in which the bubbles have a softening point of at least 750° C.

18. Glass particles of claim 15, 16 or 17 in which the glass bubbles include sulfur in an amount less than about 0.2 weight percent.

19. Glass bubbles of claim 15, 16 or 17 in which the glass bubbles include sulfur in an amount less than about 0.1 weight-percent.

20. Glass particles of claim 15 which include at least 1 weight-percent of RO oxides.

21. Glass particles of claim 15 which include at least 5 weight-percent of $Na_2O$.

22. Glass particles of claim 15 which include between about 2 and 10 weight-percent $B_2O_3$.

23. Glass particles of claim 15 in which the glass bubbles have a Relative Strength of at least 40 percent.

24. Glass particles of claim 15, 16 or 17 in which the stated ingredients are present within the following weight-percent ranges:

| | |
|---|---|
| $SiO_2$ | 65-85 |
| $Na_2 + K_2O + Li_2O$ | 5-15 |
| $B_2O_3$ | 2-10 |
| S | 0.01-0.2 |
| RO | 1-15 |
| $RO_2$ (other than $SiO_2$) | 0-1 |
| $R_2O_3$ (other than $B_2O_3$) | 0-5 |
| $R_2O_5$ | 0-5 |
| F | 0-5 |
| Other ingredients | 0-2 |

25. Injection-molded article comprising a polymeric matrix and bubbles of claim 15 dispersed in the matrix.

26. Extrusion-molded article comprising a polymeric matrix and bubbles of claim 15 dispersed in the matrix.

27. Cement product comprising a cementitious matrix and glass bubbles of claim 15 dispersed in the matrix.

28. Glass bubbles of claim 15 containing a gaseous fill under pressure.

29. Free-flowing mass of glass particles, at least 85 volume-percent of which are glass bubbles that float on water, said glass bubbles having an average diameter between about 5 and 200 micrometers and an average particle density of at least 0.4 gram/cubic centimeter, and consisting essentially of the following ingredients in the stated weight-percent ranges:

| | |
|---|---|
| $SiO_2$ | 60-90 |
| $Na_2O + K_2O + Li_2O$ | 2-20 |
| $B_2O_3$ | 2-10 |
| S | 0.005-0.2 |
| RO | 0-25 |
| $RO_2$ (other than $SiO_2$) | 0-10 |
| $R_2O_3$ (other than $B_2O_3$) | 0-20 |
| $R_2O_5$ | 0-10 |
| F. | 0-5 |
| Other ingredients | 0-2 |

30. Glass particles of claim 29 in which sulfur is present in an amount less than 0.1 weight-percent.

31. Glass particles of claim 29 or 30 which include at least 1 weight-percent of RO oxides.

32. Glass particles of claim 29 or 30 in which the glass bubbles have a density of at least 0.5 gram/cubic centimeter.

33. Glass particles of claim 29 or 30 in which the glass bubbles have a relative strength of at least 30 percent.

34. Glass particles of claim 29 or 30 in which the glass bubbles have a softening point of at least 750° C.

* * * * *